(12) United States Patent
Bennett et al.

(10) Patent No.: US 6,420,696 B1
(45) Date of Patent: Jul. 16, 2002

(54) EMBEDDED SENSOR HAVING AN IDENTIFIABLE ORIENTATION

(76) Inventors: Thomas E. Bennett, 31 Portola Ct., Danville, CA (US) 94506; Drew V. Nelson, 840 Cabot Ct., San Carlos, CA (US) 94070

( * ) Notice: Subject to any disclaimer, the term of this patent is extended or adjusted under 35 U.S.C. 154(b) by 104 days.

(21) Appl. No.: 09/603,460

(22) Filed: Jun. 22, 2000

Related U.S. Application Data

(60) Provisional application No. 60/173,360, filed on Dec. 27, 1999.

(51) Int. Cl.[7] .............................................. G01B 11/16
(52) U.S. Cl. .............................. 250/227.14; 250/227.16
(58) Field of Search ........................ 250/227.16, 227.14, 250/227.18; 340/555, 556, 557; 73/760, 768, 783

(56) References Cited

U.S. PATENT DOCUMENTS

| | | | |
|---|---|---|---|
| 4,581,527 A | | 4/1986 | Crane et al. |
| 4,854,706 A | | 8/1989 | Claus et al. |
| 4,935,043 A | * | 6/1990 | Yamauchi et al. ............ 65/3.12 |
| 5,210,499 A | | 5/1993 | Walsh |
| 5,367,376 A | | 11/1994 | Lagakos et al. |
| 5,591,965 A | | 1/1997 | Udd |
| 5,757,487 A | * | 5/1998 | Kersey ........................ 356/345 |
| 5,828,059 A | | 10/1998 | Udd |
| 5,869,835 A | | 2/1999 | Udd |
| 6,266,091 B1 | * | 5/2001 | Cryan ......................... 356/477 |
| 6,335,524 B1 | * | 1/2002 | Udd et al. .............. 250/227.18 |

OTHER PUBLICATIONS

Lawrence, C.M.; Nelson, D.V.; Udd, E.; Bennett, T.;"A Fiber Optic Sensor for Transverse Strain Measurement" Experimental Mechanics, vol. 39 No. 3; Sep. 1999; pp. 203–210.

Schultz, W.L.; Udd, E.; Morrell, M.; Seim, J.; Perez, I.; Trego, A.; "Health monitoring of an adhesive joint using a multi–axis fiber grating strain sensor system"; SPIE, vol. 3586; Jan., 1999; pp. 41–52.

* cited by examiner

Primary Examiner—Robert H. Kim
Assistant Examiner—Irakli Kiknadze
(74) Attorney, Agent, or Firm—T. P. Evans

(57) ABSTRACT

An apparatus and method is described wherein a sensor, such as a mechanical strain sensor, embedded in a fiber core, is "flagged" to identify a preferred orientation of the sensor. The identifying "flag" is a composite material, comprising a plurality of non-woven filaments distributed in a resin matrix, forming a small planar tab. The fiber is first subjected to a stimulus to identify the orientation providing the desired signal response, and then sandwiched between first and second layers of the composite material. The fiber, and therefore, the sensor orientation is thereby captured and fixed in place. The process for achieving the oriented fiber includes, after identifying the fiber orientation, carefully laying the oriented fiber onto the first layer of composite, moderately heating the assembled layer for a short period in order to bring the composite resin to a "tacky" state, heating the second composite layer as the first, and assembling the two layers together such that they merge to form a single consolidated block. The consolidated block achieving a roughly uniform distribution of composite filaments near the embedded fiber such that excess resin is prevented from "pooling" around the periphery of the fiber.

16 Claims, 2 Drawing Sheets

EMBEDDED SENSOR HAVING AN IDENTIFIABLE ORIENTATION

CROSS-REFERENCE TO RELATED APPLICATIONS

The following application for patent is a continuation-in-part of, and claims priority to, co-pending U.S. Provisional Application Serial No. 60/173,360, filed Dec. 27, 1999.

STATEMENT OF GOVERNMENT INTEREST

The United States Government has rights in this invention pursuant to Contract No. DE-AC04-94AL85000 between the United States Department of Energy and the Sandia Corporation for the operation of the Sandia National Laboratories.

BACKGROUND OF THE INVENTION

1. Field of the Invention

The present invention is related to a fiber sensors which have a preferred, useful, rotational orientation, and to a method for easily identifying that orientation to a user of the sensor. In particular, the present invention is drawn to an optical fiber sensor having an asymmetric feature or "sensing" means, which is intended to be fixed to a mechanical structure for remotely sensing a physical parameter, and to a method for adapting the fiber to such a use.

This invention also relates to a means for deploying a sensing system, and more particularly to a sensing system utilizing an asymmetric optical fiber, which enables the continuous non-destructive monitoring of a component in more-or-less real time.

2. Prior Art

There is increasing interest and use of composite materials, for many years. Typically, such composite materials comprise various layers or plys of a fiber, e.g. glass fiber, carbon fiber, or some other fiber, bonded together by a resin or polymer.

For various reasons, composite materials are gaining wide acceptance in many industries where the ability to accurately monitor component structural integrity or surrounding environmental conditions is vital. Furthermore, with the development of fibers having embedded anisotropic mechanical features it is now possible to monitor several physical parameters simultaneously. See U.S. Pat. Ser. Nos. 5,828,059 and 5,591,965.

Monitoring techniques have been proposed, using a network of optical fibers embedded into the structure of a component and forming an integral part of it, and such techniques potentially have a number of advantages. Theoretically, through the use of optical fiber sensing technology can be used for a number of purposes: e.g. impact detection and location; delamination and microcrack detection and location; strain and deformation mapping.

It is known to embed optical fibers into a composite material. One proposal can be found in U.S. Pat. No. 4,581,527 (Crane et al) disclosing a damage assessment system using a three-dimensional grid of embedded optical fibers. U.S. Pat. Nos. 4,854,706, 5,210,499 and 5,367,376 discuss embedding optical fibers in resins or resin impregnated tapes. Furthermore, U.S. Pat. Ser. No. 4,854,706 discusses orienting the optical fiber within the resin composite. However, none of the references have been found to teach a means for attaching an orientation marker or "flag" onto the fiber shank in order to permit the quick identification of the fiber orientation at a later time subsequent to application of the flag.

SUMMARY OF THE INVENTION

It is therefore an object of this invention to provide a means for identifying the position of a sensor which yields an asymmetric response to an input load.

A object of this invention is to provide a means for identifying the angular position of one of a radial axis of an optical fiber having a sensor exhibiting an asymmetric load response.

Yet another object of this invention is to provide a tag or "flag" attached to the exterior of the optical fiber or sensor such that the axis of interest lies either in the plane of the "flag," perpendicular to it, or at some known rotational orientation.

Still another object of this invention is to provide an optical fiber having a sensor exhibiting an asymmetric load response embedded in a prepreg tow.

Another object of this invention is to provide a method for embedding a fiber within a composite media such that anisotropic mechanical strain may be detected by an embedded fiber having a sensor exhibiting an asymmetric load response.

Yet another object of this invention is to provide a method for embedding a fiber within a prepreg tow such that resin is prevented from "pooling" or forming preferentially zones or pockets at the surface of the fiber, especially along a seam between a sandwich of tow of said prepreg tows.

Additional objects and advantages of this invention will become apparent to those skilled in these arts as the following specification and claims is reviewed.

BRIEF DESCRIPTION OF THE DRAWINGS

FIGS. 1 through 3, below provide additional description of the instant invention and together with the written description and appended claims constitute the complete description of the instant invention. The attached FIGURES are briefly described as follows:

FIG. 2 is a photomicrograph of a prior art example of resin "pooling" around an optical fiber.

FIG. 3 is a photomicrograph of the present invention showing the absence of resin "pooling" around the sensor.

DETAILED DESCRIPTION OF THE INVENTION

Figure 1A:
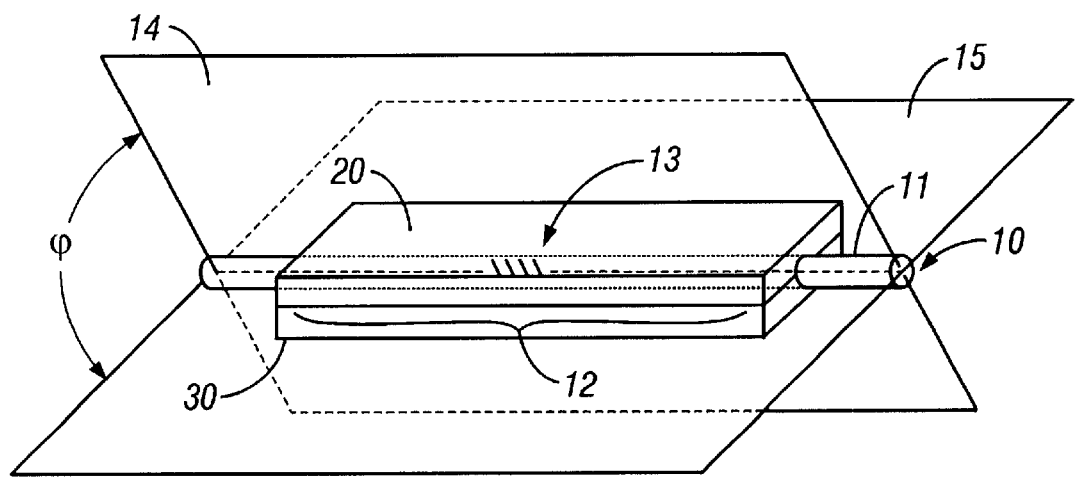
FIG. 1A schematically illustrates the sensor and alignment "flag" of the present invention.

The present invention described below teaches a method for identifying a physical, positional, orientation of a sensor having an anisotropic sensing means embedded therein. The invention is manifested as a structural "tag" attached to the sensor where the tag is arranged in a plane which includes an axis of anisotropy of the sensor. That is to say, the tag identifies a plane normal to, or at some known angle with, a direction in which the sensing means reaches a maximum response to a stimulus.

While the following discussion is drawn specifically to an optical fiber it need not be restricted to these devices alone. Any similar narrow gage fiber which can be made to transmit a detectable signal is also intended as part of this disclosure. The fiber may be an optical fiber, an electrically conducting wire, a silicon chip, or any other device having an anisotropic feature where it is desirable to locate and align the device in a composite structure such that the axis of anisotropy is oriented in a preferred direction.

The fiber need not have any particular symmetry and may even be highly asymmetric although the instant invention finds its greatest usefulness when the orientational location of the embedded sensing feature is difficult if not impossible to determine by mere casual inspection of the fiber exterior shape. It also follows that the sensor need not be, and probably would not be, in practice, a continuous fiber. The sensor could be a composite structure comprising a spliced fiber made up of one or more individual lengths of fiber such as might occur in a sensor embodied as a "tree" structure comprising multiple branches or comprising more than one sensor means responsive to different stimuli (strain, pressure, temperature, vibration, etc.) and/or providing a different signal response type (optical, electrical, electromagnetic, binary state, etc.).

Accordingly, the instant invention herein disclosed comprises a method for fixing and identifying the orientation of a sensor, generally, and a compound optical fiber, in particular, wherein the sensor or optical fiber has been constructed in such a way as to deliberately exhibit some form of axial asymmetry. Typically this asymmetry takes the form of a mechanical or structural variation normal to the fiber axis, i.e., the fiber face. Also described is a structure comprising an oriented fiber surrounded by a planar layer of a composite polymer, in which the plane of the planar layer is placed in a known orientation with respect to the radial direction of interest of the fiber.

Optical fibers are currently used as sensors for detecting a variety of physical parameters. Current technique uses an optical fiber which is either fixedly attached to, or embedded into, a target component, such as an airfoil, so that it cannot move or rotate independently. The optical fiber, therefore, becomes part of the target component and responds as the component responds as it is mechanically loaded. Furthermore, if the sensor includes an asymmetric internal structure, such as a fiber optic comprising a grating "written" into a polarization preserving media, the sensor will provide a multiaxis response to the induced strain. However, at present, there does not exist a simple way for reproducibly fixing a fiber sensor to or into a structure such that the internal structure (asymmetry) of the fiber is oriented with respect to the desired plane of reference in the target component. Typical current methods require mapping the fiber orientation and then transferring the fiber to the desired location on the component to be monitored. There the sensor is incorporated into the component structure using standard composite assembly techniques such as "laying" up alternating layers of woven fibers and resin over the sensor fiber. Unfortunately, handling the fiber in this manner can, and invariably does, allow the fiber to rotate, or twist, significantly, thus losing control of the fiber orientation.

What is needed, therefore, is a simple method for providing a visual cue to an assembler for quickly identifying a positional orientation of a fiber sensor in order that it might be easily incorporated during assembly without requiring undue experimentation and cost delay time. To address this need, the Applicants herein disclose a method for fixing the angular position of an optical fiber sensor which includes a sensor exhibiting an asymmetric load response. Applicants have found that by first securing one end of an optical fiber and then mapping the response of the fiber until a desired orientation is established, its angular position may be suitably maintained while a planar tab of a carbon composite material, or some other similar fiber/resin, is placed beneath the fiber. The fiber is then brought into contact with the composite tab or "flag," and the tab heated slightly in order to soften the resin such that the resin wets the surface of the fiber. A second composite layer, similar in size and shape, is then also heated and carefully placed on the first layer such that the two layers sandwich the fiber between the two planar layers.

It is known that in order to correctly set the desired orientation of the fiber it must first be placed in a set of fiber chucks which grasp the fiber around its outside surface. This allows an operator to rotate the fiber through 360° ($2\pi$ radians) of rotation while measuring the parameter of interest. It has been discovered that once the correct orientation has been determined, the operator may carefully lift one end of the fiber, such that it does not twist or rotate, and place it onto a first layer of a prepreg composite tow.

The terms "prepreg" and "tow" are terms of art well known to those in this field. In particular, "prepreg" means any composite filament system comprising a combination of mat, fabric, nonwoven material, or roving which is impregnated with a resin or other matrix material, wherein the matrix material is an essentially homogeneous resin or polymer material in which the filament system of a composite is embedded. Both thermoplastic and thermosetting resins are generally used as matrix materials, although use of metals and ceramics is also known. Briefly, "tows" are untwisted bundle of continuous filaments, i.e., bundles of reinforcing fibers. The tow is impregnated with a curable polymeric matrix material. A preferred material is tows of man-made fibers such as carbon fibers with a heat-curable epoxy matrix material impregnated therein. Other fiber types such as glass (such as e-glass and s-glass) or aramid fibers, for example, may be used. Any other heat curable matrix material such as any phenolic, vinyl ester, and polyester, or combinations thereof, for example, may also be used. One advantage of the present approach is that it permits great flexibility in the selection of the reinforcing material. A tow designated as "140K" has 140,000 filaments. Such tows are available commercially from various manufacturers.

Figure 2:
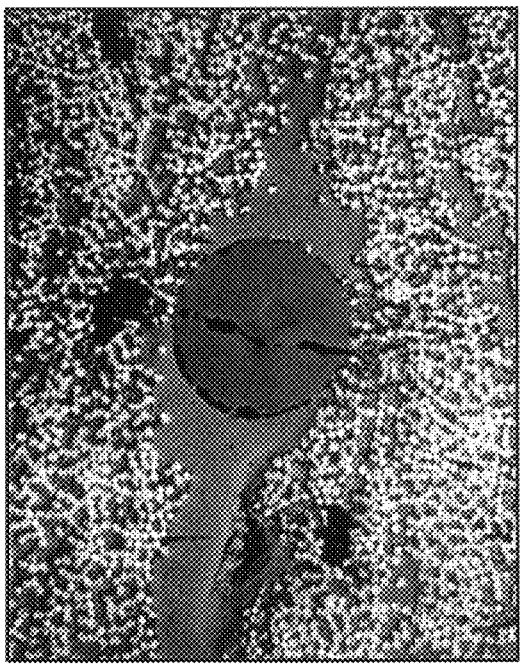
Figure 3:
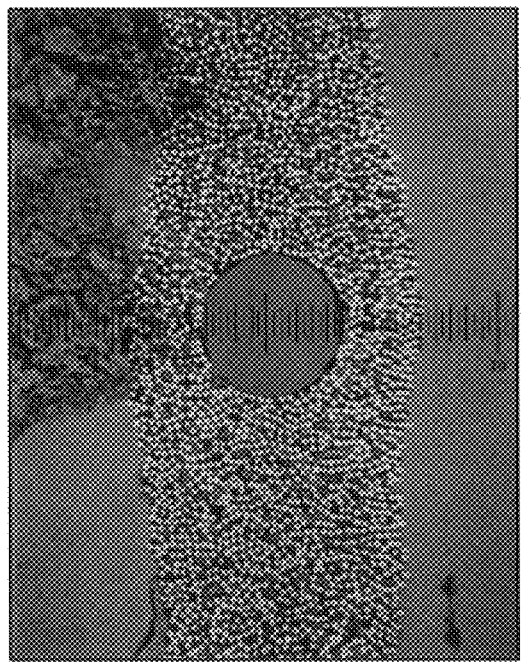

In addition, it has been found that due to its viscoelastic properties the prepreg matrix material tends to "wet" the surface of the glass fiber and to uniformly flow around its outside surface such that when a second tow layer is placed on top of the first layer, thereby sandwiching the glass fiber between them, the two layers flow together to form a single monolithic composite block. The important consequence of this assembly is the total lack of non-uniformity in the prepreg tow surrounding the glass fiber. This block of material completely surrounds the fiber and because the binder/filament composite flows and merges as a single system the filament material is uniformly distributed around the fiber sensor preventing pockets of the matrix material from pooling up on either side of the fiber surface at the junction between the outside diameter of the fiber and the interface between the two tow layers. An example of the "pooling" effect is shown in FIG. 2. This is contrasted in FIG. 3 by the absence of any noticeable "pooling" in the device of the present invention.

Figure 1B:
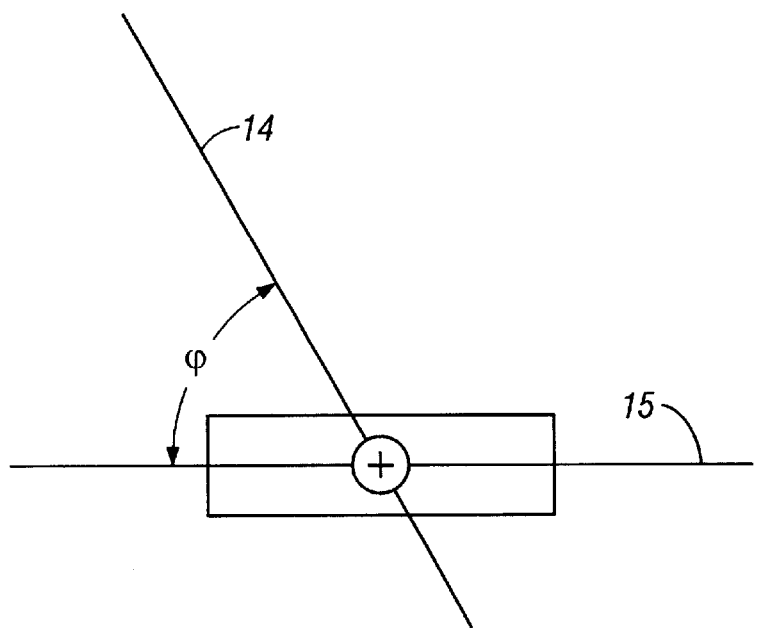
FIG. 1B shows an "end-on" cross section of the sensor of FIG. 1A illustrating the orientation of the two planes 14 and 15.

Fiber 10 is shown in FIG. 1 and illustrates the present invention graphically. A portion of the optical fiber cladding 11 may be stripped away, if necessary, in order to expose just the bare glass fiber 12. Fiber 10 is an optical fiber having longitudinal axis and a feature or property 13, such as an internally written optical grating, incorporated in the core of the fiber along some or all of the length of the fiber longitudinal axis. In addition, the presence of an internal feature 13, such as a strain sensor, imparts an asymmetry to fiber 10 which can be detected by mechanically loading the fiber in a direction transverse to the fiber longitudinal axis (parallel to a radial axis of fiber 10) and detecting the differential response in a signal transmitted along the length of the fiber. The angular position of the internal feature, therefore, can be mapped by alternately rotating the fiber through several degrees, loading a length of the fiber surface, and measuring the optical response to the load until the fiber has been tested through 360° of rotation.

Once fiber 10 has been mapped, the desired orientation may be re-established by rotating a chuck (not shown) securing a proximal end of fiber 10, until fiber 10 is positioned such that feature 13, lying in plane 14, makes an angle, $\phi$, with respect to a common reference plane 15, herein the plane of the test bed. Fiber 10 is then placed onto a first layer of prepreg tow 20 lying in plane 15, to fix its position by carefully lifting the proximal end of fiber 10 slightly (the chuck restraining this end of the fiber helps to maintain the fiber orientation and prevent twisting), moving first tow layer 20 underneath fiber 10, and lowering and setting fiber 10 onto first tow layer 20. The tow and fiber are then heated slightly, with a heat gun, for example, to a temperature of about between 120° F.–150° F., until the tow just becomes "tacky." Due to this "tacky" nature the binder material used to form the matrix of the tow flows around fiber 10 slightly thereby capturing and rotationally fixing the position of the fiber. A second tow layer 30 is then heated as before and placed over the first layer 20 to form a short "tab." These two layers are then forced together, in a direction transverse to the fiber axis, under modest pressure, typically just enough to bring the two layers together in order to establish contact between each of them.

This achieves a fiber wire onto which a wide, thin, layer of composite is bonded thereby providing a means for identifying a specific orientation of the fiber wire with respect to the specific angular rotation of the internal feature of the wire. Since the attached composite tow layers act as a "flag," the assembled sensor can be easily placed within a mechanical structure while maintaining the orientation of the fiber axis with respect to that structure. Furthermore, in a second embodiment multiple "flags" may be applied along the length of a long fiber to prevent undesired rotation along the length as the fiber is positioned for assembly.

Thus there has been shown and described a novel means to align asymmetric optical fiber sensors into composite material using tabs which fulfill all the objects and advantages sought therefor. Many changes, modifications, alterations and other uses and applications which do not depart from the spirit and scope of the invention are deemed to be covered by the invention which is limited only by the claims that follow.

What is claimed is:

1. A sensor having an alignment means, comprising;
    a fiber having longitudinal and radial orthogonal axes, said radial axis and said longitudinal axis defining a first plane, said optical fiber further having at least one sensing means, said sensing means internally distributed along, and about, at least a portion of a length of said longitudinal axis, said sensing means producing a detectable signal response in a signal transmitted along said longitudinal axis to a mechanical load applied in a direction perpendicular to said first plane, said response reaching a maximum value as said radial axis is rotated about said longitudinal axis, said radial axis aligned at an angle, $\phi$, with respect to said first plane at said maximum response value;
    a planar tab having a first surface, said first surface parallel with said first plane, said planar tab fixedly attached to said fiber wherein said radial axis is aligned at said angle, $\phi$, with respect to said first plane.

2. The sensor of claim 1, wherein the fiber is an optical fiber.

3. The sensor of claim 1, wherein the fiber is a composite fiber, said composite fiber comprising one or more lengths of similar or dissimilar fibers.

4. The sensor of claim 3, wherein the fiber comprises a plurality of said lengths arranged in a diverging or converging pattern.

5. The sensor of claim 3, wherein the composite fiber comprises metal wire and optical fiber in combination, said metal wire and said optical fiber having an interface comprising a transducer.

6. The sensor of claim 1, wherein said planar tab comprises a plane layer of a prepreg tow, said layer having a first thickness.

7. The sensor of claim 6, wherein said prepreg tow is a composite filament system comprising a combination of a nonwoven fiber bundle impregnated with a resin or other matrix material.

8. The sensor of claim 7, wherein the nonwoven fiber bundle is an untwisted bundle of continuous filaments.

9. The sensor of claim 7, wherein the nonwoven material is selected from the list consisting of metals, ceramics, man-made fibers such as carbon fibers, e-glass, s-glass, and aramid fibers.

10. The sensor of claim 7, wherein the resin is selected from the list consisting of any thermoplastic and thermosetting resin, epoxy, heat curable polymer, phenolic, vinyl ester, and polyester, or combination thereof.

11. The sensor of claim 1, wherein said planar tab comprises a second layer of a prepreg tow, said second layer having a second thickness, said first and second layers sandwiching said fiber sensor.

12. The sensor of claim 11, wherein said first and second layer thicknesses are about equal.

13. The sensor of claim 11, wherein said first and second layers merge to form a single, continuous layer, said single layer comprising a plurality of continuous, untwisted filaments embedded in an impregnating matrix having an approximately uniform distribution and aligned about parallel with said fiber longitudinal axis longitudinal axis, said filaments surrounding said fiber sensor such that the distribution of filaments everywhere proximate to said fiber is approximately the same as the distribution of filaments distal to said fiber.

14. A method for aligning and identifying a feature of a fiber sensor, the method comprising the steps of:
    a.) providing a fiber having longitudinal and radial orthogonal axes, said axes defining a first plane, said fiber further having a sensing means radially distributed about said longitudinal axis and along at least a portion of a length of said longitudinal axis, said sensing means providing a detectable response in a signal transmitted along said longitudinal axis, to a mechanical load applied to said fiber perpendicular to said first plane;
    b.) measuring said response of said fiber as said fiber is unloaded, incrementally rotated about said longitudinal axis, and reloaded;
    c.) identifying an angle, $\phi$, between said first plane and said radial axis which provides a maximum response of said sensing means;
    d.) laying said fiber sensor onto a first prepreg tow layer such that said radial axis of said fiber makes an angle, $\phi$, with said first prepreg layer;

e.) heating said first layer;

f.) heating a second prepreg tow layer;

g.) laying said second prepreg tow layer over said first layer; and h.) applying a pressure across said first and second layers sufficient to bring said layers together into contact.

15. The method of claim 14, wherein the steps of heating further includes heating said first and second tow layers to a temperature of between about 100° F. and 150° F.

16. The method of claim 14, wherein the step of measuring further comprises the steps of:

a.) securing one end of the sensor in a chuck;

b.) rotating the chuck in order to rotate the sensor through a plurality of small angular increments;

c.) mechanically loading the fiber in a direction transverse to said longitudinal axis and transmitting a signal along said longitudinal axis;

d.) noting the response of the sensor to the applied load;

e.) repeating step b) through d) until the fiber has been rotated through 360°; and f.) determining the angular rotation producing a maximum signal response; and g.) establishing an rotational orientation providing a maximum response.

* * * * *